E. R. CARICHOFF.
MOTOR CONTROL.
APPLICATION FILED OCT. 24, 1916.
1,287,217.
Patented Dec. 10, 1918.
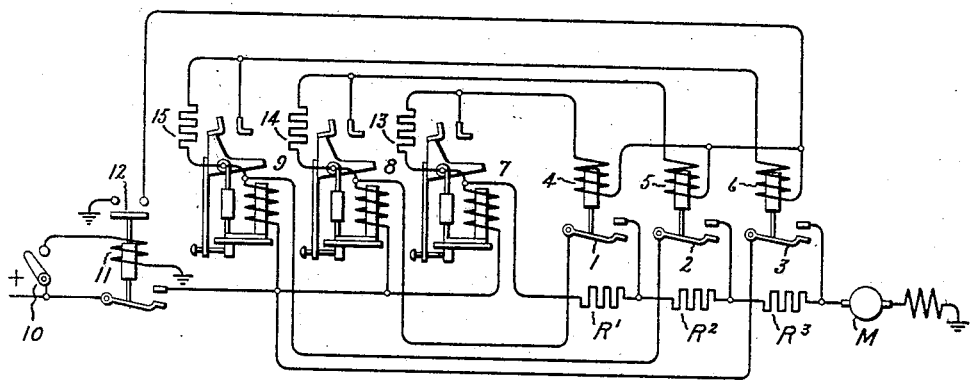
Inventor:
Eugene R. Carichoff,
by Albert G. Davis
His Attorney.

UNITED STATES PATENT OFFICE.

EUGENE R. CARICHOFF, OF SCHENECTADY, NEW YORK, ASSIGNOR TO GENERAL ELECTRIC COMPANY, A CORPORATION OF NEW YORK.

MOTOR CONTROL.

1,287,217.     Specification of Letters Patent.     Patented Dec. 10, 1918.

Application filed October 24, 1916. Serial No. 127,485.

*To all whom it may concern:*

Be it known that I, EUGENE R. CARICHOFF, a citizen of the United States, residing at Schenectady, county of Schenectady, State of New York, have invented certain new and useful Improvements in Motor Controls, of which the following is a specification.

My invention relates to the control of an electric motor and it provides improved means whereby the motor may be started, stopped, and generally controlled in a simple, reliable and efficient manner.

My invention has a particular usefulness in the starting of larger sizes of electric motors. Such motors are ordinarily started by including a resistance in the motor circuit and electromagnetically actuated switches having shunt coils are provided for cutting out sections of this resistance as the speed of the motor increases and the motor current drops. Series current limit relays responsive to the main motor current have heretofore been provided for energizing the windings of these switches to cut out the resistance at the proper time and interlocks were provided for securing the desired sequence of operation of the switches. These interlocks have been objectionable because of the difficulty of securing good electrical contact due to dust collecting on the interlocks, corrosion and the pitting caused by the arcs formed as the circuits at the interlocks are broken. One of the objects of my invention is to retain the electromagnetically actuated switches having shunt windings and eliminate the troublesome interlocks. In carrying my invention into effect, I provide a plurality of series contactors, one for the winding circuit of each switch, and use these contactors as current limit relays. These series contactors may be of the well known type which are held open when the operating current is high and are closed when the operating current falls to a predetermined value. These contactors are connected so that they will operate in succession responsively to the motor current, the arrangement being such that each contactor in closing short circuits a resistance in the winding of an electromagnetically actuated resistance switch thereby causing this switch to operate and cut out a section of resistance in the motor circuit. The closing of the resistance switch short circuits the series contactor which caused it to open and re-inserts the resistance in the winding circuit of the resistance switch. The coil of the next series contactor of the succession is also simultaneously included in the motor circuit. By this arrangement the defects of the ordinary series current limit relays are avoided as the contacts can all be closed by a positive magnetic force and given a wiping action to insure good electrical contact. Furthermore, the series contactors, which in my arrangement are used as relays, can all be made relatively quite small as they are required to carry the full motor current for a very short period.

Referring to the drawing, the single figure of which shows diagrammatically the control for an electric motor embodying my invention, the electric motor M having an armature and series field has included in its armature circuit at starting the sections of resistance R¹, R², R³. These sections of resistance are short circuited by means of the electromagnetic resistance switches having contact members 1, 2 and 3. The magnet windings 4, 5 and 6 of these switches are energized in a shunt or independent circuit to the motor circuit and are controlled by means of series contactors 7, 8 and 9 respectively. These series contactors act as current limit relays to control the operation of the electromagnetic resistance switches, and as shown, they are of the well known type which hold open when the current is high and close when the current drops to a predetermined value. These series contactors are connected in the armature circuit in succession, and each contactor in closing short circuits a resistance in the winding circuit of its respective electromagnetic resistance switch, causing the resistance switch to close and short circuit a section of resistance in the motor circuit. Each of the electromagnetic resistance switches in closing not only short circuits a section of the armature resistance, but also short circuits the winding of the series contactor which caused it to operate and at the same time includes the winding of the next series contactor in the succession in the motor circuit. The contact member of each of the series contactors is electrically connected to its coil circuit and to the winding circuit of its respective electromagnetic resistance switch. By closing a pilot switch 10 in the coil circuit of the electromagnetically actuated line switch 11, this line switch is energized to close the motor armature circuit. The electromagnetically actuated switch 11 has an interlock which completes the circuit for the windings 4, 5 and 6 of the electromagnetic resistance switches.

The operation of my device is as follows:

In order to start the motor the pilot switch 10 is first closed. This energizes the coil of the electromagnetically actuated switch 11, causing this switch to pick up its contact member and close the motor circuit, at the same time completing the circuit for the windings, 4, 5 and 6 at the interlock 12, the circuit for these windings being through the coils of series contactors 7, 8 and 9 and the resistances 13, 14 and 15, respectively. The resistances 13, 14 and 15 are of such value that sufficient current will not flow through the windings to close the switches. The motor circuit is now from the source of supply through the contact member of electromagnetically actuated switch 11, coil of series contactor 7, starting resistances $R^1$, $R^2$, $R^3$, through the armature and series field of the motor to ground. The contact member of series contactor 7 will be magnetically held open when the motor current is above a predetermined value and will be magnetically closed and held closed when the motor current drops below that predetermined value.

When the contact of series contactor 7 closes after the motor current has dropped below the predetermined value due to the increased speed of the motor, it closes a short circuit around the resistance 13 and energizes the first electromagnetic resistance switch to close and cause contact member 1 to cut out the first section $R^1$ of the starting resistance, the circuit for the winding 4 being through the contact of electromagnetic switch 11, coil of series contactor 7, contact of series contactor 7, winding 4 through interlock 12 to ground. As soon as the first electromagnetic resistance switch closes it not only cuts out the first section $R^1$ of the starting resistance but at the same time short circuits the coil of series contactor 7 which caused it to operate, the short circuit including the series coil of series contactor 8. The coil of series contactor 8 is thus included in the motor circuit. Short circuiting the coil of series contactor 7 causes this contactor to open and re-insert the resistance 13 in the circuit of the winding 4. The electromagnetic resistance switch will not open since this resistance will permit sufficient current to flow through the winding 4 to maintain the contact member 1 closed. After the motor current drops to the predetermined value due to the increased speed of the motor armature, the series contactor 8 will close and short circuit the resistance 14, permitting the winding 5 to close the switch member 2, cutting out the second section of starting resistance $R^2$, causing the series contactor 8 to open the short circuit around resistance 14, and at the same time including the coil of series contactor 9 in the motor circuit. The principle of operation of the series contactor 9 is the same as series contactors 7 and 8; namely, in closing it causes the winding 6 to be energized picking up the contact member 3, short circuiting the last section $R^3$ of the starting resistance and opening the series contactor 9, re-inserting the resistance 15 in the circuit of winding 6. In order to stop the motor the pilot switch 10 is opened thus opening the electromagnetic switch 11 and the electromagnetic resistance switches.

It will readily be seen that my arrangement makes possible the use of electromagnetic switches having their windings energized through circuits independent of the motor armature circuit, and that none of the troublesome interlocks have been necessary to secure the desired progression of these electromagnetic resistance switches. The series contactors 7, 8 and 9 can be made relatively quite small because of the fact that they are required to carry the full armature current for a very short period in starting. The contactors have the great advantage that their contact members make positive electrical contact. In the type of series contactor which I have chosen for purposes of illustration, the contact members are closed and held closed by magnetic force and given a wiping action as they close, thus insuring positive electrical contacts and positive operation of the electromagnetic switches.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with an electric motor of means for starting the same, comprising a plurality of electromagnetic switches for cutting out resistance from the motor circuit and having windings energized independently of the motor armature circuit, a plurality of electromagnetic switches energized by current in the armature circuit and arranged to hold open when the current in the armature circuit is high and close when the current falls to a predetermined value, each of said latter switches in closing causing one of the resistance switches to operate, and connections whereby each resistance switch in closing causes the opening of the electromagnetic switch which caused it to operate.

2. The combination with an electric motor of means for starting the same, comprising a plurality of electromagnetic switches for cutting out resistance from the motor circuit, a plurality of series contactors energized by current in the armature circuit and arranged to hold open when the current in the armature circuit is high and close when the current falls to a predetermined value, each of said series contactors in closing causing one of the resistance switches to operate and open the series contactor which caused the resistance switch to operate.

3. The combination with an electric motor of means for starting the same, comprising a plurality of electromagnetic switches for cutting out resistance from the motor circuit, a plurality of series contactors energized in succession by current in the armature circuit and arranged to hold open when the current in the armature circuit is high and close when the current falls to a predetermined value, each of said series contactors in closing causing one of the resistance switches to operate, and connections whereby each resistance switch in closing opens the series contactor which caused it to operate and energizes the next series contactor in the succession.

4. The combination with an electric motor of means for starting the same, comprising a plurality of electromagnetic switches for cutting out resistance from the motor circuit, a plurality of normally opened series contactors energized in succession by current in the armature circuit and arranged to hold open when the current in the armature circuit is high and close when the current falls to a predetermined value, each of said series contactors in closing causing one of the resistance switches to operate, and connections whereby each resistance switch in closing short circuits the winding of the series contactor which caused it to operate and includes the winding of the next series contactor in succession in the motor armature circuit.

5. The combination with an electric motor of means for starting the same, comprising an electromagnetic switch for cutting out resistance from the motor circuit, a winding for said switch energized independently of the motor circuit, a resistance in the circuit of said winding, a series contactor energized by current in the motor circuit having its coil connected to its contact member and to the winding of the electromagnetic switch, the said contactor arranged to hold open when the current is high and to short circuit the resistance in the winding circuit of the electromagnetic switch when the current falls to a predetermined value, causing the electromagnetic switch to operate and cut out resistance from the motor circuit, and connections whereby the electromagnetic switch in closing causes the series contactor to open, re-inserting the resistance in the winding of the electromagnetic switch.

6. The combination with an electric motor of means for starting the same, comprising a plurality of electromagnetic switches for cutting out resistance from the motor circuit, each having a winding connected in shunt to the motor through a resistance, a plurality of series contactors energized by current in the armature circuit and arranged to hold open when the current is high and close when the current falls to a predetermined value, each of said series contactors in closing short circuiting a resistance in the winding circuit of one of said switches to cause the switch to operate, and connections whereby the operation of the switch causes the series contactor to open and reinsert the resistance in the winding circuit of the resistance switch.

7. The combination with an electric motor of means for starting the same, comprising a plurality of electromagnetic switches for cutting out resistance from the motor circuit, each having a winding connected in shunt to the motor through a resistance, a plurality of series contactors energized in succession by current in the armature circuit and arranged to hold open when the current is high and close when the current falls to a predetermined value, each of said series contactors in closing short circuiting a resistance in the winding circuit of one of said switches causing the switch to operate, and connections whereby each resistance switch in closing causes the resistance to be reinserted in its winding circuit and includes the winding of the next series contactor in the succession in the motor armature circuit.

8. The combination with an electric motor of means for starting the same, comprising a plurality of electromagnetic switches for cutting out resistance from the motor circuit, each having a winding connected in shunt to the motor through a resistance, a plurality of series contactors energized in succession by current in the armature circuit and arranged to hold open when the current is high and close when the current falls to a predetermined value, each of said series contactors in closing short circuiting a resistance in the winding circuit of one of said switches causing the switch to operate, and connections whereby each resistance switch in closing opens the series contactor which caused it to operate and includes the winding of the next series contactor in the succession in the motor armature circuit.

In witness whereof, I have hereunto set my hand this 23rd day of October, 1916.

EUGENE R. CARICHOFF